United States Patent
Adamski

(10) Patent No.: US 10,938,202 B2
(45) Date of Patent: Mar. 2, 2021

(54) SYSTEM AND METHOD FOR MINIMIZING INRUSH CURRENT

(71) Applicant: ADVANCED DIGITAL BROADCAST S.A., Bellevue (CH)

(72) Inventor: Artur Adamski, Zielona Gora (PL)

(73) Assignee: ADVANCED DIGITAL BROADCAST S.A., Bellevue (CH)

( * ) Notice: Subject to any disclaimer, the term of this patent is extended or adjusted under 35 U.S.C. 154(b) by 32 days.

(21) Appl. No.: 16/199,328

(22) Filed: Nov. 26, 2018

(65) Prior Publication Data

US 2019/0165568 A1   May 30, 2019

(30) Foreign Application Priority Data

Nov. 28, 2017 (EP) .................................. 17204016

(51) Int. Cl.
  *H02H 9/00* (2006.01)
  *G05F 1/573* (2006.01)
  *H02H 9/02* (2006.01)

(52) U.S. Cl.
  CPC ............. *H02H 9/002* (2013.01); *G05F 1/573* (2013.01); *H02H 9/001* (2013.01); *H02H 9/02* (2013.01)

(58) Field of Classification Search
  CPC .......... H02H 9/002; H02H 9/001; H02H 9/02; G05F 1/573
  See application file for complete search history.

(56) References Cited

U.S. PATENT DOCUMENTS

| | | | |
|---|---|---|---|
| 2006/0083259 A1* | 4/2006 | Metcalf ................. | H04L 12/403 370/458 |
| 2010/0253413 A1 | 10/2010 | Wu | |
| 2011/0015793 A1* | 1/2011 | Crist ...................... | A01G 25/16 700/284 |
| 2011/0184578 A1* | 7/2011 | Elwell .................... | H01H 47/02 700/295 |
| 2012/0078389 A1* | 3/2012 | Hashimoto ........... | G06F 1/3209 700/22 |

FOREIGN PATENT DOCUMENTS

WO   2016/044726 A1   3/2016

* cited by examiner

*Primary Examiner* — Thomas C Lee
*Assistant Examiner* — Charles Cai
(74) *Attorney, Agent, or Firm* — Mark M. Friedman

(57) ABSTRACT

A method for minimizing inrush current of at least two electrical devices (211-219), the method being characterized in that it comprises the steps of: forming (1001) a network, managed by a host (420), of at least two inrush current controllers (500) each selectively controlling power supply to an associated electrical device (211-219); for each inrush current controller (500) defining, by the host (420), and applying (1002) a time delay value specified per device; setting (1003), in each inrush current controller (500), the respective delay value as a time delay between a request to supply the associated electrical device (211-219) with power and actually supplying it with power; wherein the delay value differs between the at least two inrush current controllers (500).

8 Claims, 12 Drawing Sheets

SYSTEM AND METHOD FOR MINIMIZING INRUSH CURRENT

TECHNICAL FIELD

The present invention relates to a system and method for minimizing inrush current. In particular, the present invention relates to minimizing inrush current while powering-up many devices at the same time.

BACKGROUND OF THE INVENTION

High inrush current is a result of the maximum instantaneous input current drawn by an electrical device during an initial power up process. As technology continues to advance, most systems today run efficiently and maintain low impedance, which in turn contributes to high inrush current.

Inrush current is particularly problematic while powering-up many devices at the same time. This is because the inrush current is summing from each device into the one, relatively large, current peak in a very short time. Such situation happens for example at power restoration after a power outage, when all electrical devices at a premise are powered-up at the same time.

A very high inrush current is, in such cases, able to cross over a limit of a power network's fuse and trigger an MCB (Mini Circuit Braker), resulting in no power restoration for the given premise. Moreover, manual trials of switching "ON" the MCB is unsuccessful because of the same phenomenon, thus, power cannot be restored.

Origin of the Inrush Current:

FIG. 1 presents electrical schematics of a power supply (SMPS type (Switching Mode Power Supply)) present in most of the modern electrical devices found at typical households.

The SMPS is an electronic power supply that comprises a Rectifier Bridge (101), a Reservoir Capacitor (102) and a Switching Regulator (103) to convert electrical power efficiently. It also comprises a transformer (104), a switching element (105) and an output diode (106) for filtering. The SMPS in general transfers power from an AC source (mains power) to DC loads, while converting voltage and current characteristics.

Inrush current (107) is flowing during plugging the electrical device into mains and is mostly caused by charging the input reservoir capacitor (102) with high voltage amplitude, especially during first half of the mains power cycle. The high current flow is a result of the high voltage amplitude appearing on very low impedance of the input reservoir capacitor represented by so called ESR parameter (Equivalent Series resistance).

Inrush current peak, due to its nature, is very short in time. It appears in the region of milliseconds with typical peak values about tens of Amperes.

Currently there are several solutions dealing with limiting high inrush current. The most typical ones are the applications of various electronic components, (NTC thermistors, resistors, switchable MOSFETs, etc.), which lower the inrush current peak by introducing series resistance into the circuit (http://www.ametherm.com/inrush-current). The drawback of these solutions (depending on the application) is either too high operating resistance causing supply voltage drops or too little resistance being not enough for the current limit. Also temperature sensitivity is an issue here because "hot start" conditions differ a lot from "cold start" conditions, whereas the inrush limit operation mechanism strongly depends on the temperature.

More sophisticated solutions base on "active circuits" which use triacs or thyristors and the circuits driving them (https://www.ametherm.com/inrush-current/inrush-current-faq.html). These solutions are more precise in terms of inrush current limit control, but at the same time are more complex and expensive, what makes them applicable for dedicated device types only.

It must be further noted that the existing solutions apply to the devices on a design level (specific components application), while most of the electrical devices designs do not take inrush current into consideration.

Additionally, there are not any solutions for this problem without interference to the device.

It would be advantageous to provide alternative and cost effective solutions to minimizing inrush current, which is the aim of the present invention.

SUMMARY AND OBJECTS OF THE PRESENT INVENTION

An object of the present invention is a method for minimizing inrush current of at least two electrical devices, the method being characterized in that it comprises the steps of: forming a network, managed by a host, of at least two inrush current controllers each selectively controlling power supply to an associated electrical device; for each inrush current controller defining, by said host, and applying a time delay value specified per device; setting, in each inrush current controller, the respective delay value as a time delay between a request to supply said associated electrical device with power and actually supplying it with power; wherein the delay value differs between the at least two inrush current controllers.

Preferably, said inrush current controller, is implemented in a wall socket or in a power strip or in a socket adapter or in a power supply or as a part of said electrical device.

Preferably, said network is a wired electrical network of a wireless network.

Preferably, said delay value between two electrical devices, configured to be switched on directly one after another, is in a range of 100 ms to 1000 ms.

Preferably, each inrush current controller is configured to measure inrush current of the electrical device controlled by it and report said measurement to the host.

Another object of the present invention is a method for operating an inrush current controller characterized in that it comprises the step of: associating the inrush current controller with an electrical device; registering the inrush current controller within a network of at least two inrush current controllers each selectively controlling power supply to an associated electrical device; receiving and applying a time delay value; setting, the respective time delay value as a time delay between a request to supply said associated electrical device with power and actually supplying it with power.

Preferably, the method further comprises the steps of: awaiting a request to supply said associated electrical device with power; waiting for the time delay value; and supplying said associated electrical device with power.

Preferably, the method further comprises the step of measuring current parameters and reporting it to a network Host.

Another object of the present invention is a computer program comprising program code means for performing all the steps of the computer-implemented method according to the present invention when said program is run on a computer.

Another object of the present invention is a computer readable medium storing computer-executable instructions performing all the steps of the computer-implemented method according to the present invention when executed on a computer.

BRIEF DESCRIPTION OF THE DRAWINGS

These and other objects of the invention presented herein, are accomplished by providing a system and method for minimizing inrush current. Further details and features of the present invention, its nature and various advantages will become more apparent from the following detailed description of the preferred embodiments shown in a drawing, in which.

NOTATION AND NOMENCLATURE

Some portions of the detailed description which follows are presented in terms of data processing procedures, steps or other symbolic representations of operations on data bits that can be performed on computer memory. Therefore, a computer executes such logical steps thus requiring physical manipulations of physical quantities.

Usually these quantities take the form of electrical or magnetic signals capable of being stored, transferred, combined, compared, and otherwise manipulated in a computer system. For reasons of common usage, these signals are referred to as bits, packets, messages, values, elements, symbols, characters, terms, numbers, or the like.

Additionally, all of these and similar terms are to be associated with the appropriate physical quantities and are merely convenient labels applied to these quantities. Terms such as "processing" or "creating" or "transferring" or "executing" or "determining" or "detecting" or "obtaining" or "selecting" or "calculating" or "generating" or the like, refer to the action and processes of a computer system that manipulates and transforms data represented as physical (electronic) quantities within the computer's registers and memories into other data similarly represented as physical quantities within the memories or registers or other such information storage.

A computer-readable (storage) medium, such as referred to herein, typically may be non-transitory and/or comprise a non-transitory device. In this context, a non-transitory storage medium may include a device that may be tangible, meaning that the device has a concrete physical form, although the device may change its physical state. Thus, for example, non-transitory refers to a device remaining tangible despite a change in state.

As utilized herein, the term "example" means serving as a non-limiting example, instance, or illustration. As utilized herein, the terms "for example" and "e.g." introduce a list of one or more non-limiting examples, instances, or illustrations.

DESCRIPTION OF EMBODIMENTS

The main aim of the present invention is not to limit the device inrush current, but to distribute accumulated peak evenly in time in order to relax the average current peak value.

This can be realized by number of Smart Power Sockets, able to measure the inrush current of plugged-in devices and able to communicate between each other in order to analyze, define and execute proper power-up sequence with minimal inrush current peak.

Such solution does not interfere with the device (in most of the following embodiments), thus may be adapted virtually to any device or power network.

In the following specification there is presented an inrush current controller, which may be implemented in a wall socket, in a power strip, in a socket adapter, in a power supply or as a part of an electrical device.

Figure 1:
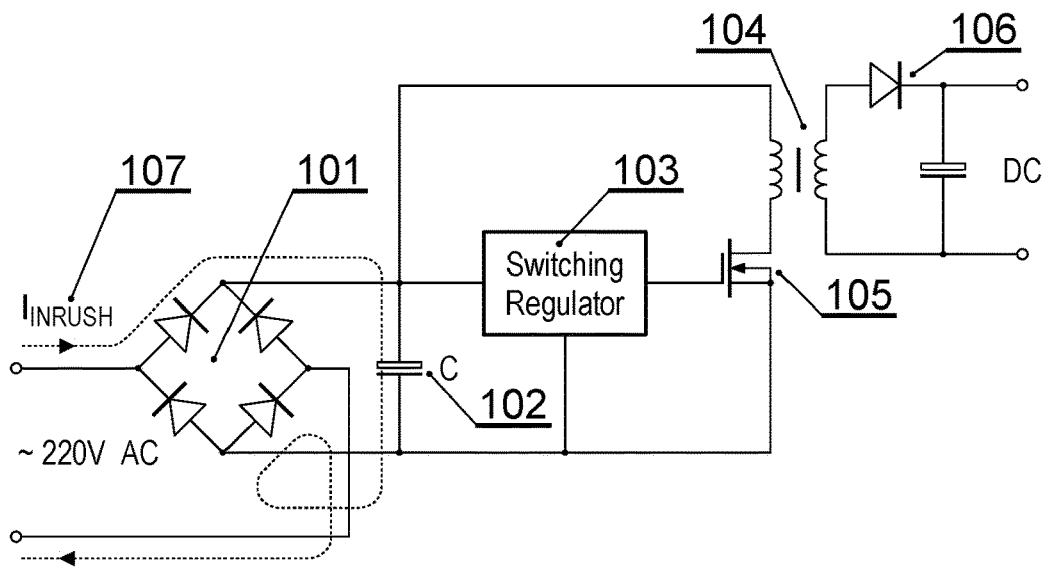
FIG. 1 presents the electrical schematics of a power supply.
Figure 2:
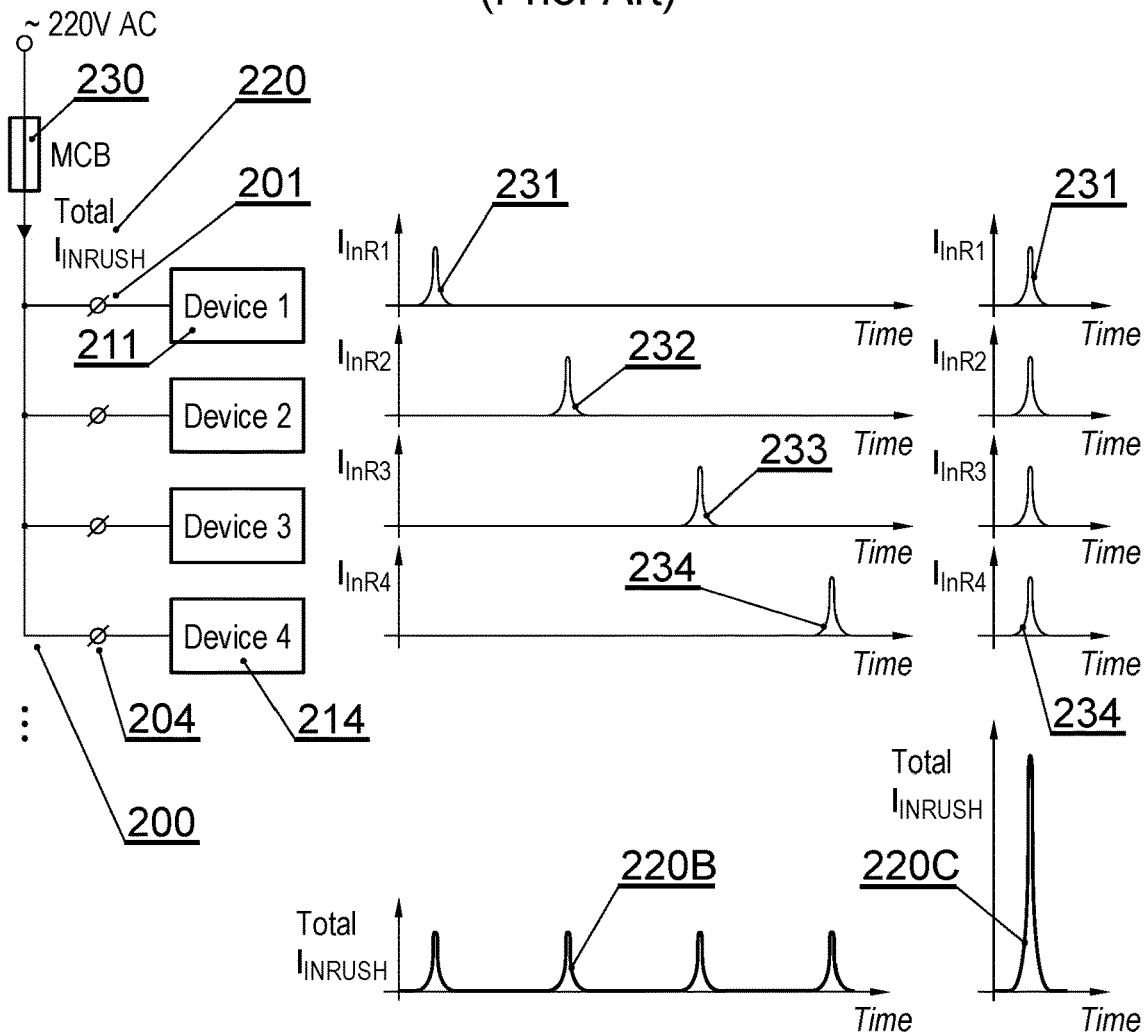
FIG. 2 presents a schematics diagram of a typical household electrical installation.

Effect of the Inrush Current Accumulation:

FIG. 2 presents a schematics diagram of a typical household electrical installation (200) with several mains sockets (201-204) representing various rooms and various electrical devices plugged-in (211-214). Each of the electrical devices generates a unique inrush peak current value ($I_{InRX}$) during power-up (231-234). The protection circuit is employed in a form of an MCB (230).

When each electrical device is plugged-in one after another into the mains, as shown in FIG. 2, the inrush current $I_{INRUSH}$ (2206) flowing through the MCB (230) is distributed in time and does not cross the MCB's (230) tripping limit value. However, if all the electrical devices are plugged into the mains at the same time, the total inrush current $I_{INRUSH}$ (220C) flowing through the MCB (230) becomes a sum of all devices inrush currents and appears as an accumulated current peak during very short time. Such high current is able to trigger the MCB (230) and cause the power outage on the network.

Figure 3:
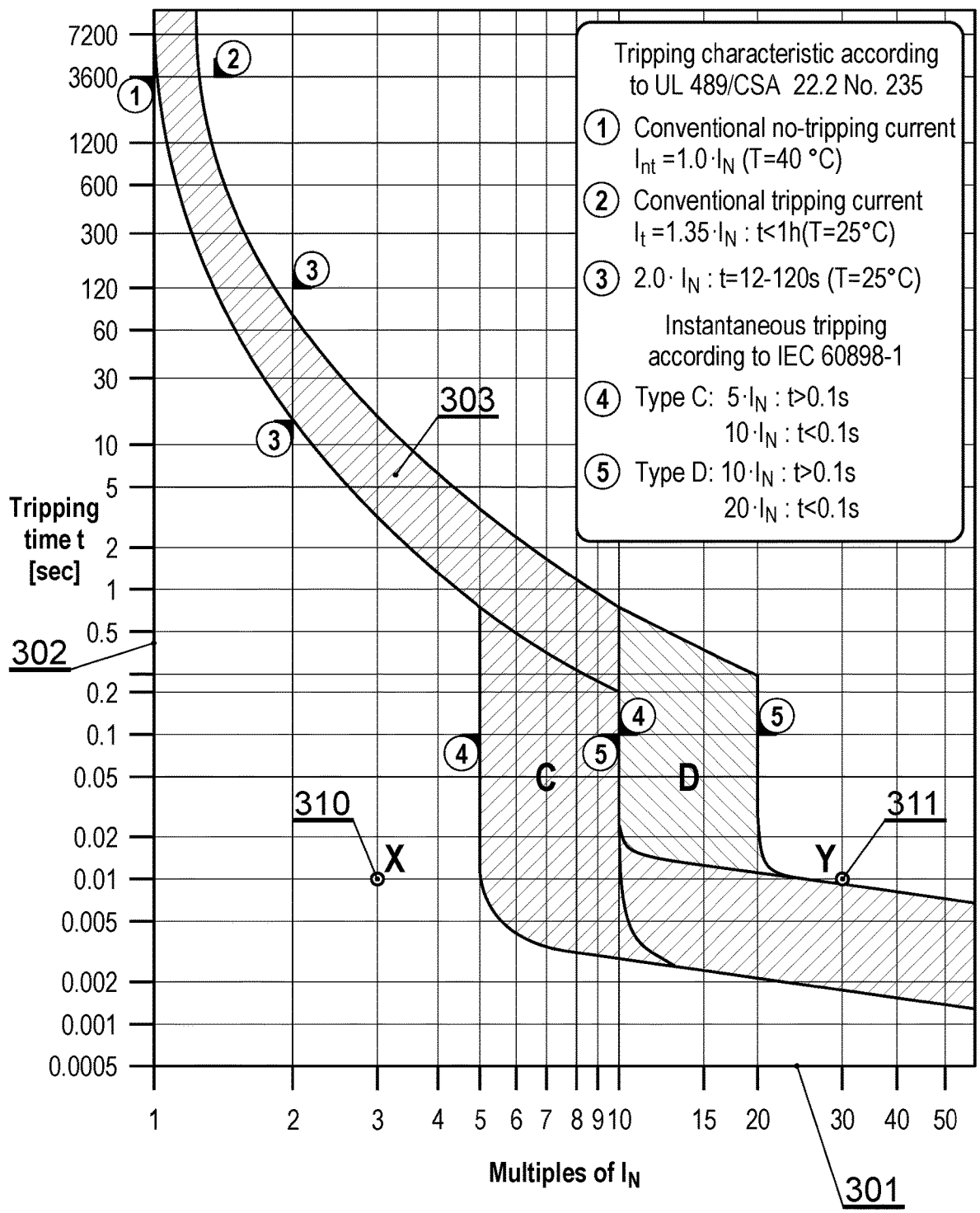
FIG. 3 presents tripping characteristics of a typical MCB present at a household.

FIG. 3 presents tripping characteristics of a typical MCB present at a household. The horizontal axis presents current flowing through the MCB (301), where the MCB's "nominal" current is depicted as $I_N$. The vertical axis represents the time duration of the current flow (302). A tripping characteristic (303). is a curve showing when the combination of the current rise and duration will automatically disconnect the given MCB circuit.

The situation, presented in FIG. 2, where each electrical device is plugged-in one after another into the mains, may be represented on this graph by the Point X (310). Devices' plug-in events generate several inrush current peaks, one after another, causing current rise and duration still within the MCB tripping limit. Therefore, the fuse circuits do not react.

The situation, presented in FIG. 2 item (220C), where all devices are plugged-in at the same time, may be represented on this graph by the Point Y (311). The Plug-in event of all devices at once generates an accumulated inrush current peak, causing current rise over the tripping limit. The fuse gets triggered and disconnects the circuit automatically.

Detailed Graph Analysis of the Above Example:

$I_N$ (MCB's nominal current)=10 A $I_{INRUSH}$ for 1 device unit=30 A @ 10 mS

Number of analyzed device units=10

Point X->10×30 A @ 10 mS peaks one after another. This is under MCB's tripping limit.

Point Y->1×300 A @ 10 mS peak at the same time. This is over MCB's tripping limit.

Figure 4A:
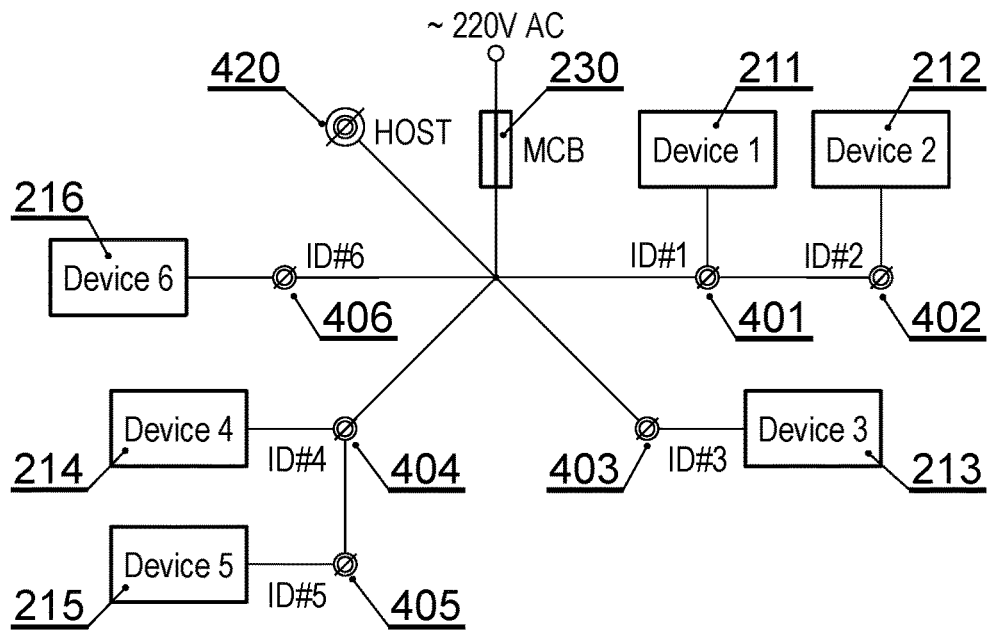
FIGS. 4A-B show examples of an entire system, according to the present invention.

Device and System Operating Principle:

The entire system, according to the present invention, is presented in FIG. 4A. The example comprises several Smart Power Sockets (401 . . . 406) (sockets in general and more generally called inrush current controllers) with connected electrical devices (211-216) and a Host managing them (420). The system is able to distribute device inrush current peaks in time during system power-on as in FIG. 2 items (231-234) and characteristic (220B), lowering the maximum peak value to a safe limit, that is not triggering the MCB (230).

In certain embodiments, one of such Smart Power Sockets (401 . . . 406) may also act as a host (420) at a given premise. This depends on a communication technique used and network organizing technique applied as will be clear to a person skilled in the art.

Smart Power Sockets are preferably Power Sockets with additional functions of:
  detecting a newly connected device;
  measuring its inrush current;
  communicating measured value to the Host (420);
  controlling power-on delay time while enabling mains power.

Figure 4B:
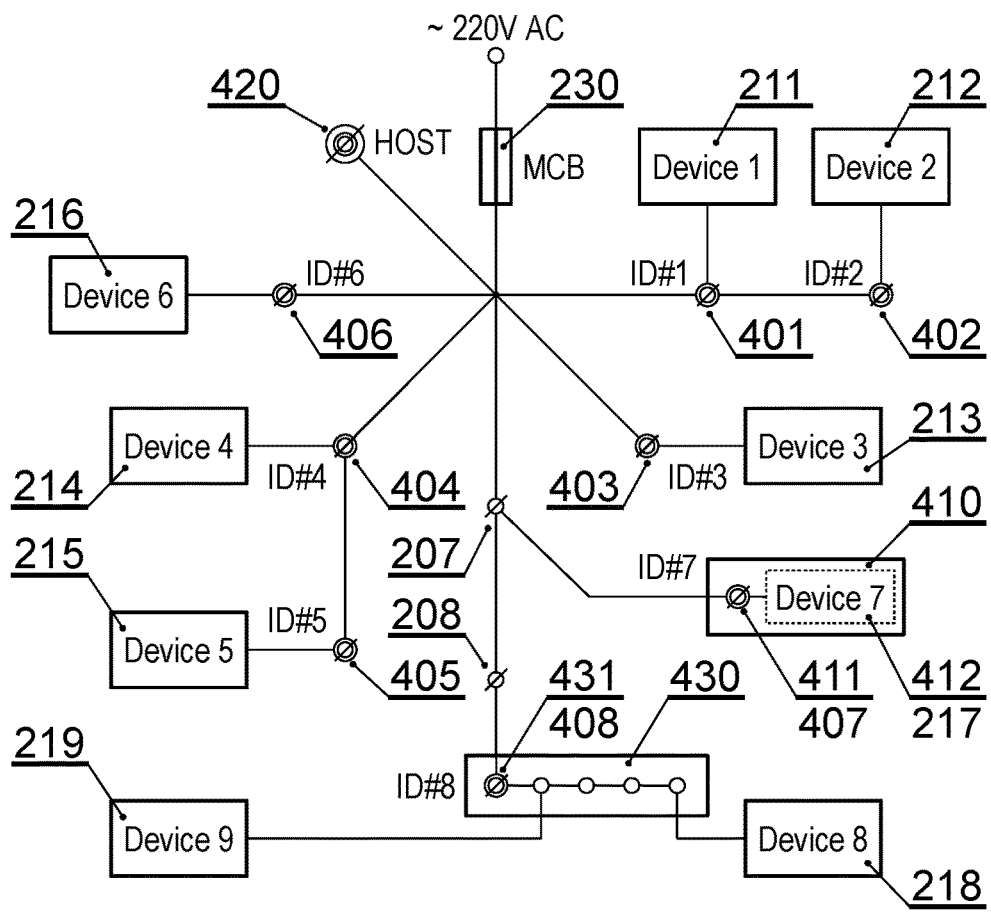

In FIG. 4B shows different embodiments of the inrush current controller, which may be implemented in a wall socket (406), in a power strip (431), in a socket adapter, in a power supply or as a part of an electrical device (411).

Figure 5:
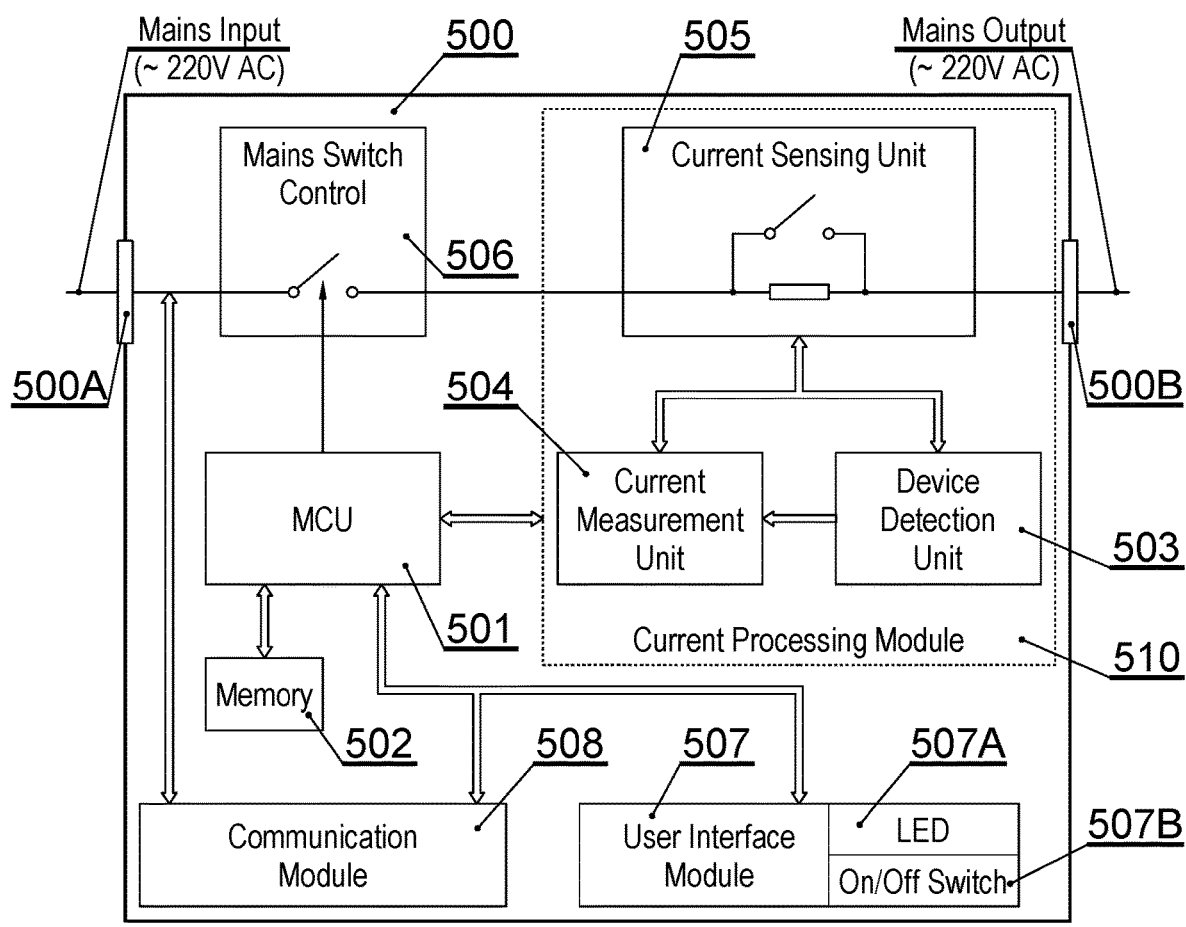
FIG. 5 depicts a Smart Power Socket.

A Smart Power Socket (500) is shown in FIG. 5. The smart power socket (500) is an example of the inrush current controller according to the present invention. It comprises mains INPUT (500A), for connecting to a power network, and controllable mains OUTPUT (500B), for connecting to at least one electrical device (211-219). The Smart Power Socket (500) comprises a Microprocessor/Microcontroller Unit (MPU/MCU) (501), a memory (502) (such as a flash storage) and several processing modules, namely: a Device detection (503) and Current measurement Module (504), a Mains Switch Control (506), a User Interface Module (507) and a Communication Module (508).

Each Smart Power Socket (500) requires its own ID for identification purpose within a network. The ID may be assigned by the Host Device (420), which manages the network.

Device detection Module (503) is responsible for detecting newly plugged electrical device(s) and initiating the inrush current measurement. Detecting of a newly plugged electrical device(s) may be realized by a continuous sensing of the current and comparing it with a reference level (0 Ampers) in a comparator circuit. If the current becomes greater than 0 Ampers, that means a new device has been plugged in.

The measurement itself is performed by Current measurement Module (504), which measures the inrush current peak value and returns the value to the MCU (501) using measurement circuits known in the art for that purpose.

The Current measurement Module (504) may also perform current measurement during normal device operation, giving additional information to the Host about device operation power consumption and status. The Device detection Module (503) and the Current measurement Module (504) may be integrated, as they share the same current sensing circuit (505) for their input data.

The Mains Switch Control Module (506) is responsible for switching mains power to the connected electrical device(s). It comprises a power switch, which is controlled by the MCU (501) in terms of enabling and disabling mains power, as well as precisely controlled delay of enabling mains power.

A communication module (508) is responsible for exchanging data and commands between the Smart Power Socket (500) and the Host device (420). It receives the data and commands from the MCU (501) and forwards them to another communication module present in Host device (420).

A Physical layer of the communication is preferably the power network which the Smart Power Sockets are connected to. Therefore, the Communication module (508) must be able to transform MCU specific communication protocol into the power line specific protocol in order to transfer the data across the power lines. Using basic HomePlug 1.0 standard (IEEE 1901) is sufficient for this purpose but similar solutions may also be applied.

The Physical layer of the communication is not limited to wired electrical network, but may as well be realized by other wireless media such as: WiFi, ZigBee, Bluetooth and similar.

A User Interface Module (507) is an optional module for the interaction with an end user. It may comprise an LED diode (507A), which displays an operation status of the electrical device connected to the mains. The LED diode may be multicolored, where different colors represent the power consumption of the device. The User interface Module (507) may additionally comprise an on/off button (507B), which serves as a manual mains switch. Touching/pressing the button may initiate the Mains Switch activation, resulting in manual toggling on/off power mains for the device.

The MCU (501) is configured to manage all the modules by means of controlling and exchanging data between them. It gathers the inrush peak current measurement data from the Current measurement Module (504) and sends it via the Communication Module (508) to the Host device (420). It also controls the User interface Module (507) by updating the information about device status or detects user requests for manual device switch on/off and executes it.

Finally, the MCU (501) is configured to receive instructions with mains delay setting, saves it to the Flash (502) for setting up the Mains Switch control Module (506) for a precise time delay, with the data received from the Host (420). The precise time delay of the mains power is a key for the subjected inrush current minimization effect.

The memory (502) may also be used for a boot-up and s/w code storage for the MCU (501). It also may store the assigned ID number and mains delay time value necessary for the correct Mains Switch Module (506) setting and sequenced power enabling process.

The Host Device (420) comprises a Microprocessor Unit (MCU), a Flash (or equivalent non-volatile memory) storage and a Communication Module. It manages the Smart Power Sockets (401 . . . 406) within the network. It assigns the ID's for each particular Smart Power Sockets and collects the data from them.

Each Smart Power Socket sends measured inrush peak current data to the Host together with an assigned ID. The Host device (420) after collecting the data may execute a computational analysis about inrush current peak values across the network. A result of the analysis is an optimized power-on sequence of the electrical devices connected to the power network with a minimal inrush peak current, similar to FIG. 2 item (220B). This defined sequence is further distributed to the Smart Power Sockets according to the IDs. Each Smart Power Socket receives instruction with its own particular delay time setting, so it can set up its Mains Switch Control Module respectively.

The Host Device (420) is either a standalone device or one of the Smart Power Sockets (Host Smart Socket) (500). Apart from optimizing the inrush current peaks distribution the Host Device (420) is able to collect the data of the electrical network operation, e.g. which electrical device is operational and what is its power consumption.

In addition, the Host device (420) may additionally communicate with an end user e.g. present statistical data about the running system (running energy costs) or even provide information about devices inrush current peak.

Finally, the Host Device (420) may communicate with the MCB (230) (assuming that a Smart/Intelligent MCB is present in the network) in order to control additional network parameters, e.g. the Host Device (420) may read from a Smart MCB its current limit available for the local network. Having this knowledge the Host Device (420) will be able to estimate and continuously monitor how much available power is left in the network. When the value becomes close to the predefined threshold, the system may communicate a warning about a potential overload of the system. By collecting such data, the Host Device (420) is aware of all previously connected devices (and their power consumption), thus it is able to predict entire system power consumption even if some currently connected devices are in an OFF state.

Figure 6:
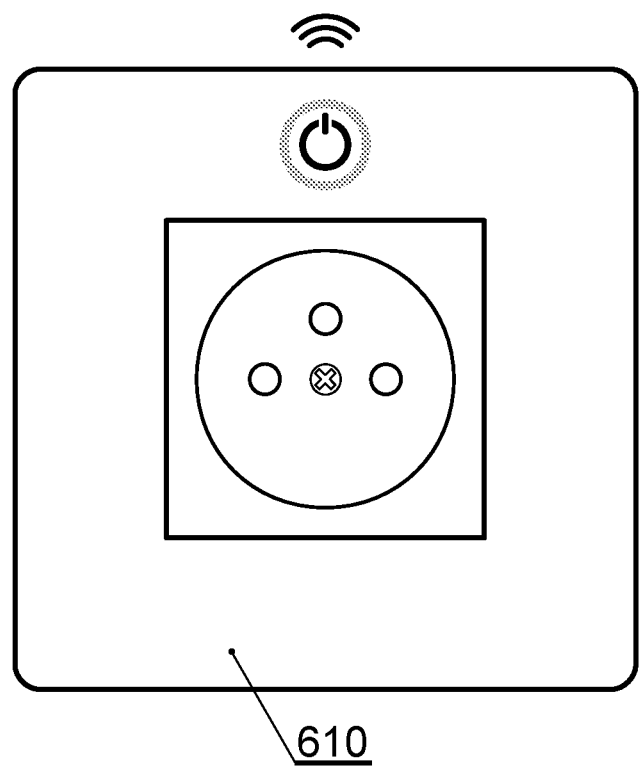
FIG. 6 shows exemplary wall socket and socket adapter.
Figure 6:
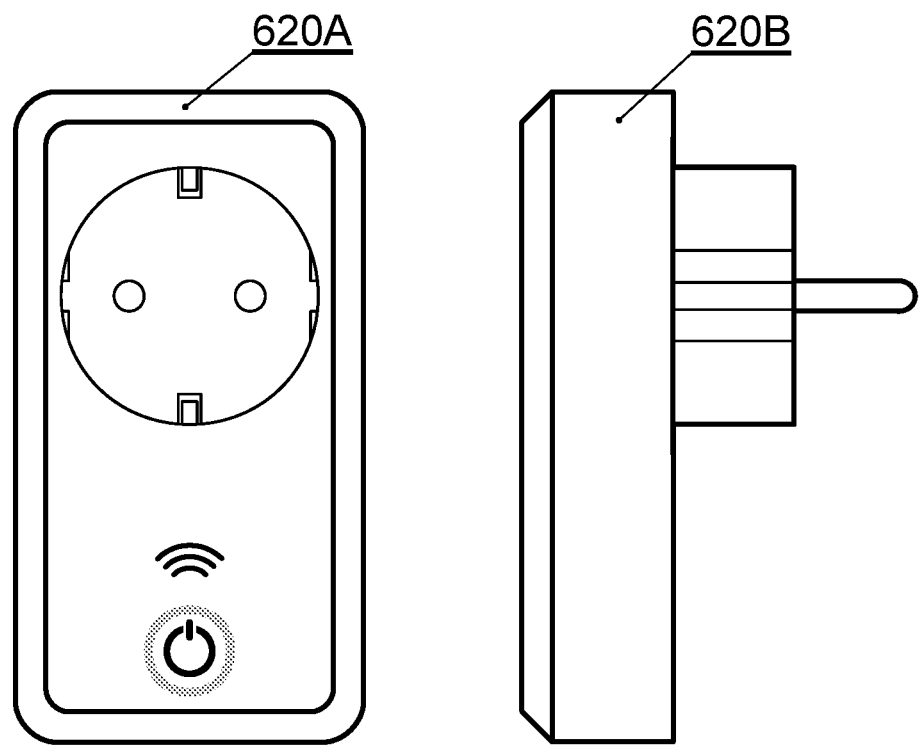

The Smart Power Socket (500) form factor may be similar to the typical power socket (610), dedicated for wall mounting in new or under modernization power network installations. It may as well be in the form factor of a socket adapter (620A, 620B), which is easy to adopt in existing power network installations (as per FIG. 6).

The system may be realized using dedicated components or custom made FPGA or ASIC circuits. The system may comprise a data bus communicatively coupled to the memory (502) and the MCU (501). Additionally, other components of the system may be communicatively coupled to the system bus so that they may be managed by the MCU (501).

The memory (502) may store computer program or programs executed by the MCU (501) in order to execute steps of the method according to the present invention.

Figure 7A:
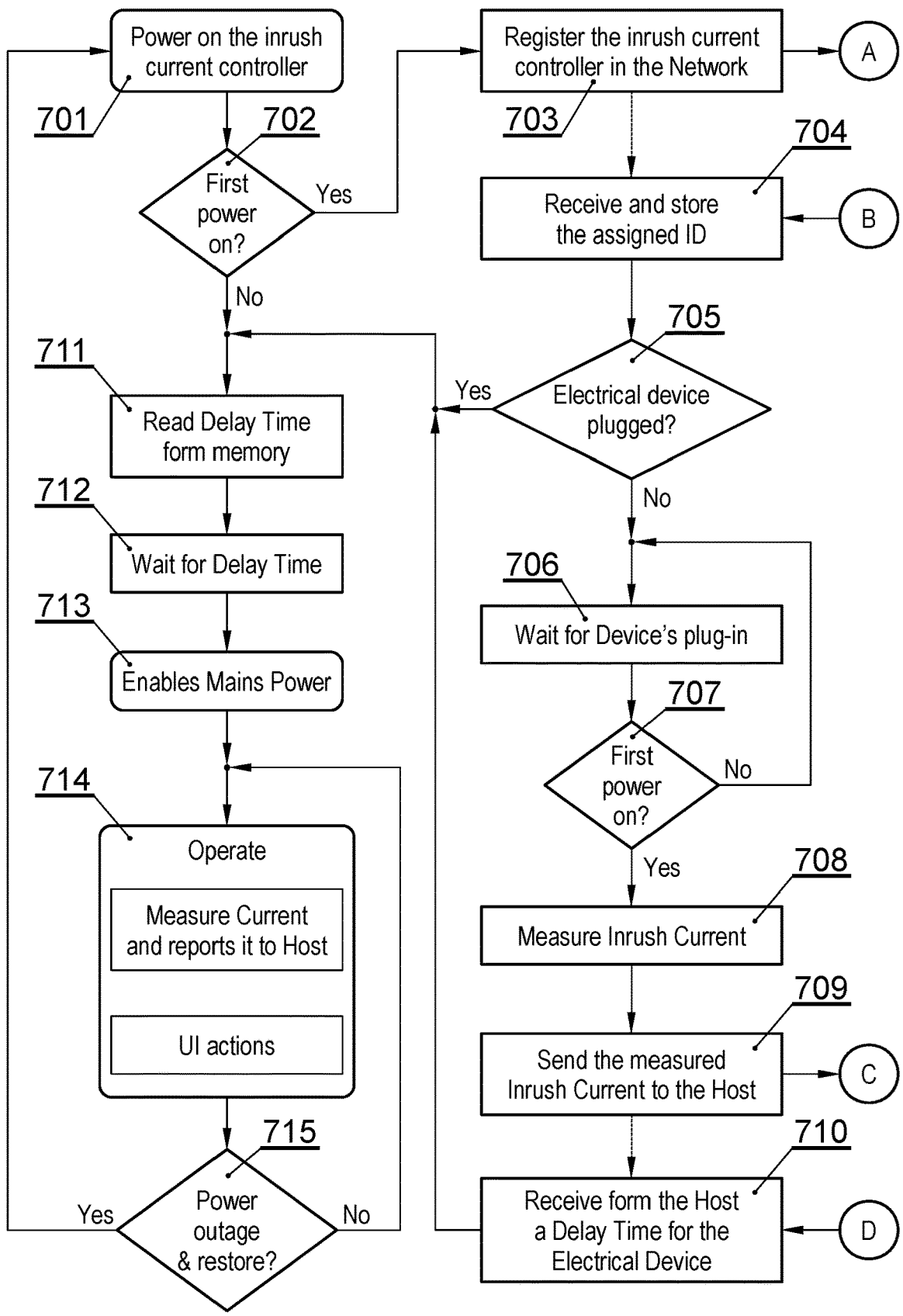
FIGS. 7A-B present a method according to the present invention.
Figure 7B:
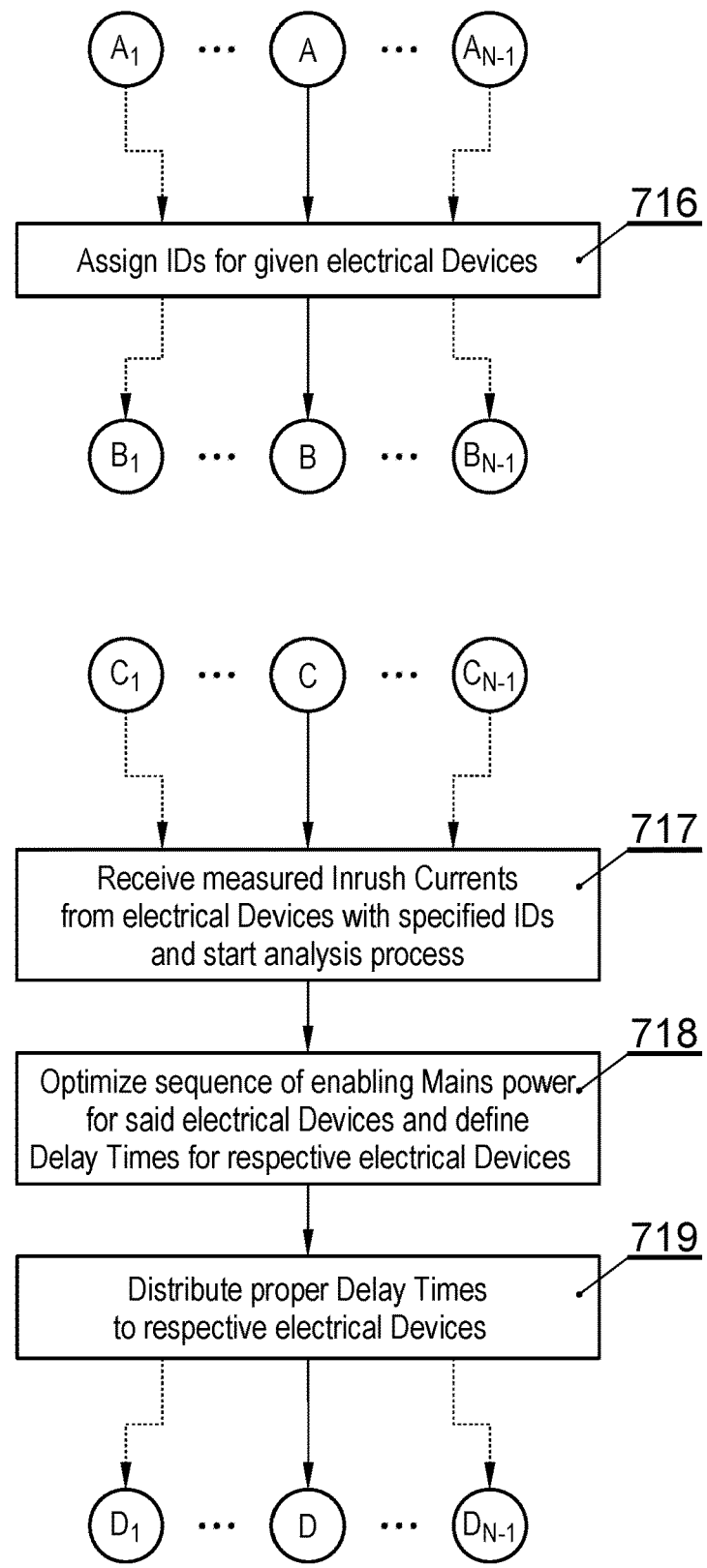

FIGS. 7A-B presents a diagram of the method according to the present invention. The method starts at step (701) from powering on the inrush current controller (e.g. the socket according to the present invention). In FIG. 7A-B, the electrical device, causing a current load, is called the electrical device (for example a TV set or a vacuum cleaner, dish washer or a fridge).

At step (702) the method may verify detection of power-on of a Smart Power Socket (500). In case of the first Smart Power Socket (500) power-on event (or optionally any power on event), the method proceeds to step (703), where the Smart Power Socket (500) needs to register to the network, managed by a Host Device (420).

The Host Device (420) is configured to assign (716) a unique ID for the identification purpose of the Smart Power Socket (500). The Smart Power Socket (500) is configured to receive and store (704) the assigned ID (for example in Flash memory) (502).

Subsequently, at step (705), the Smart Power Socket (500) checks if Electrical device is plugged. If not, it awaits (706) for the electrical device's (211-219) plug-in. After the electrical device has been plugged-in, the Smart Power Socket detects (707) it and initiates the inrush peak current measurement (708) of the electrical device.

This measured value may further be sent (709) to the Host Device (420) together with the Smart Power Socket ID. The Host (420) collects the data from all the Smart Power Sockets, analyzes this data and computes the preferred sequence of enabling the mains power across the network.

The sequence optimization process is based on smart distribution (shown with reference to FIG. 8 and FIGS. 9A-B) of the inrush current peaks in time in order to lower the maximum inrush current draw of all devices. The analysis result, which is an optimized power-on sequence of the electrical devices, is then sorted and distributed individually (according to the ID's) to each electrical device by providing for each Smart Socket a unique delay time value (710).

A Smart Power Socket receives individual instruction, allowing to set up its Mains Switch Control Module with a precisely defined delay time, thus power-up the electrical device in a defined moment of a commonly specified sequence with a preferred range of the delay being 100 mS-1000 mS between directly consecutive power-ups of the electrical devices (211-219) (nevertheless other delay times may be used depending on the electrical system and kinds of the electrical devices (211-219) used). The unique delay time is stored in memory for further system setup after, for example a power outage.

In case of mains power outage and restoration, all electrical devices are programmed, by means of the respective Smart Power Sockets (500), in order to enable the particular mains for the connected electrical devices with the precisely defined delay time.

The MCU (501) is, at step (711), reading the delay time from the memory (502). It subsequently (712) enables the mains power only after the predefined delay time has been applied and elapsed (713). As a result, the sequential power-up does not generate an accumulated inrush current peak, but distributes it over time, lowering the maximum peak value to the safe limits, not triggering the respective MCBs (230).

During normal operation (714) the inrush current controller (e.g. the socket according to the present invention) may continue measuring the electrical device's power consumption. If the value is 0 W, then it reports to the Host that the device with assigned ID is OFF. If the value is greater than 0 W then it reports to the Host that the device with assigned ID is consuming measured power value. A measured power value may be presented to an end user as devices' or network's power consumption status. Such data may also be used for creating various statistics of devices' and/or power network operation (e.g. as energy costs).

The inrush current controller equipped with an optional User interface Module (507) may enable the LED diode when a measured power value is greater than 0 W and adjust the LED color depending on the power consumption. The LED diode is preferably disabled when measured power is 0 W.

Additionally, during normal operation the inrush current controller equipped with an optional User interface Module (507) may await for a manual pressing of the on/off button.

When on/off button has been toggled, then the inrush current controller toggles the mains power of the connected device.

Typically said normal operation (714) lasts until power outage and subsequent restoration (715).

Figure 8:
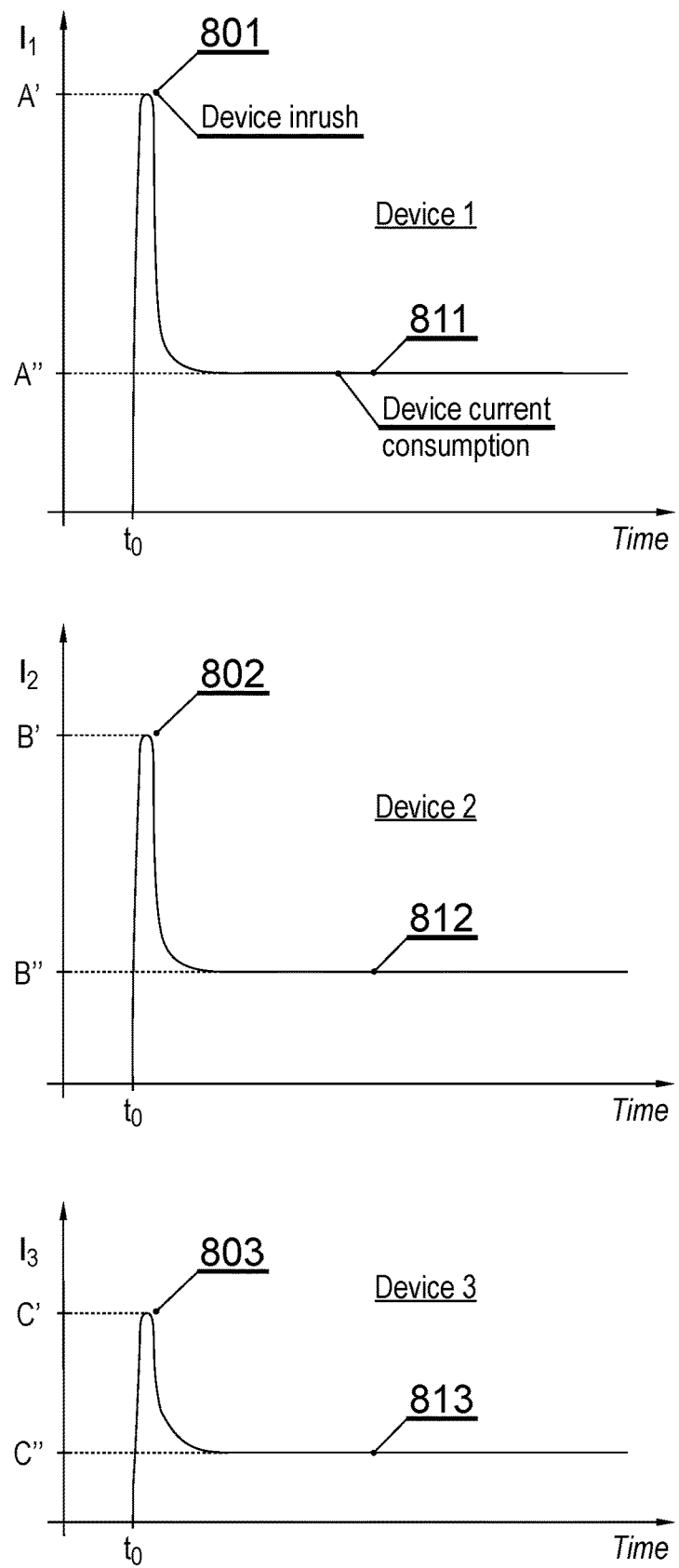
FIGS. 8-9A-B present inrush current optimization example.
Figure 9A:
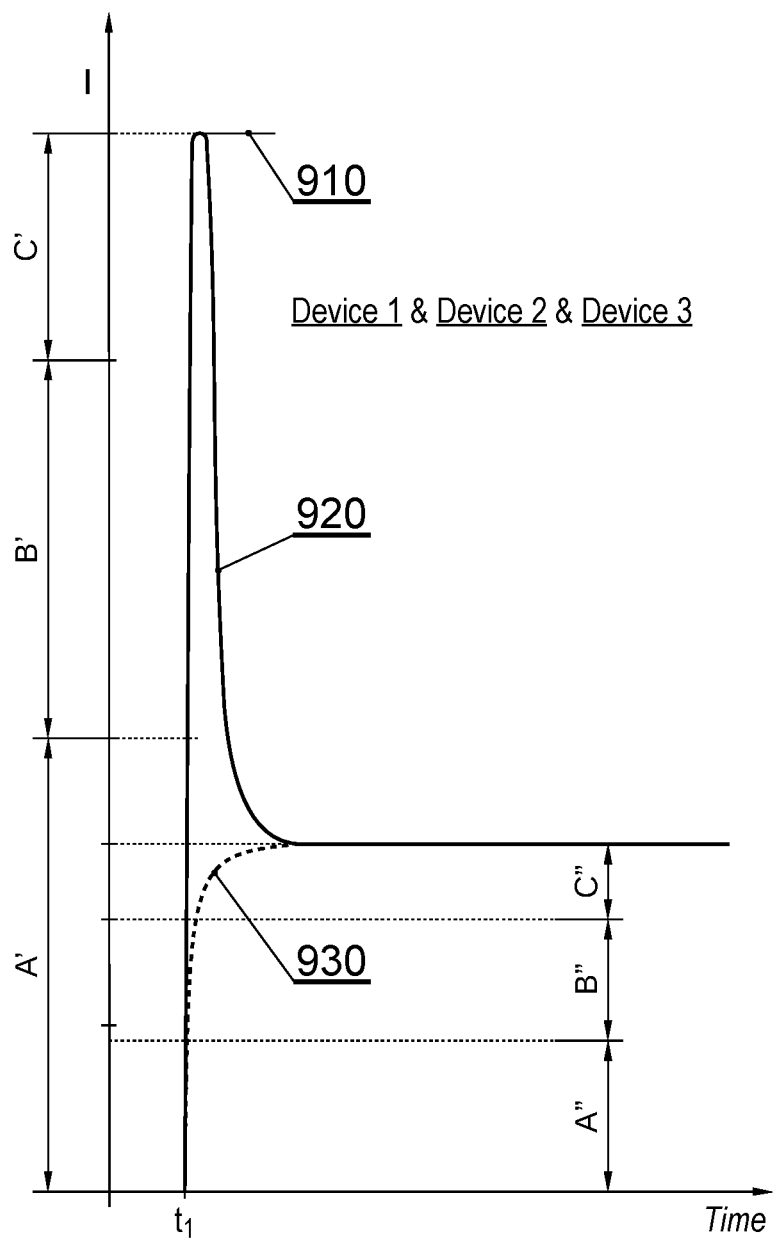

FIGS. 8-9A-B present an inrush current optimization example. The optimization process, performed preferably by the Host Device (420), distributes the inrush current peaks in time in order to lower the inrush current draw of all electrical devices (211-219) within said network managed by the Host Device (420).

The Host Device (420) is configured to obtain, for each particular electrical device (211-219), its inrush current and operating current data from Smart Power Sockets (500).

Examples of electrical devices' (211-219) current characteristic are shown in FIG. 8. Note the current axis is not to scale as device inrush current (801, 802, 803) is much higher (in the range of 10×-100× times higher) than normal device operation (consumption) current in a steady state (811, 812, 813)).

The current characteristics are different and unique for Device 1, Device 2 and Device 3 (which extends similarly to more devices respectively), what is shown accordingly in the figure where values of A', B' and C' differ and values of A", B", C" differ as well.

Figure 9B:
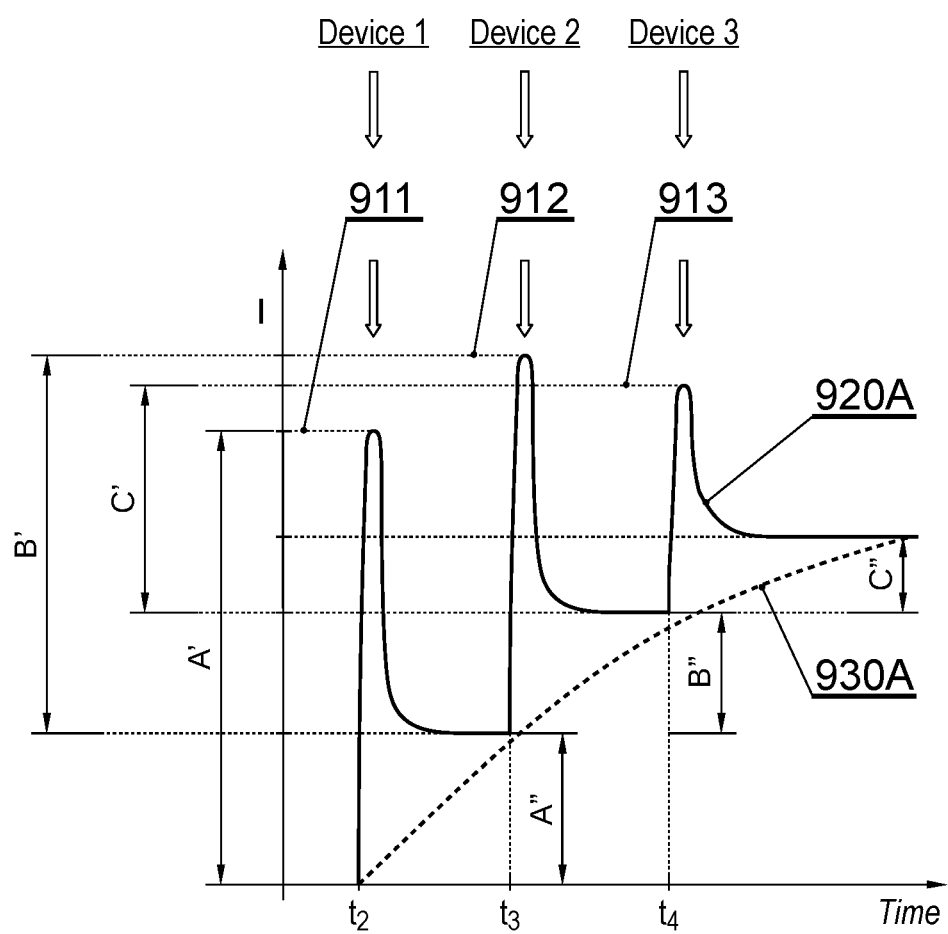

FIGS. 9A-B show the electrical devices power-up situation before and after an optimization process.

Before optimization process (FIG. 9A) all devices are powered-on at the same time (t1), thus the total inrush current (910) accumulates to the A'+B'+C' value. Total current consumption of the system in the steady state conditions (after inrush current peak) sums-up at the level of A"+B"+C" value.

Optimization process is preferably run on the Host Device (420). It takes into account all current characteristics of the electrical devices' (211-219) and it calculates current distribution in a way to power-up devices with the highest inrush current first, prior to the devices with lower inrush current (see FIG. 9B). Such sequence gives two advantages to the system:
1) it allows for relatively even distribution of the inrush current peaks, significantly lowering the original inrush current peak value (see inrush current level in FIG. 9A vs FIG. 9B); and
2) it allows for slow increase of the total network power consumption in time (930A), which is preferable from a perspective of a global energy distribution system (see averaged devices consumption current waveform: sudden increase (930A) in FIG. 9A vs slow increase (930B) in FIG. 9B).

After optimization the devices power-up sequence is as follows: Device 1 (with highest inrush current) powers-up first at the time t2. Next power-on appears for the Device 2 at the time t3, next power-on appears for the Device 3 at the time t4, next power-on etc. . . . . Clearly, the total current consumption of the system in the steady state conditions sums-up at the same level of A"+B"+C" value, the same as before optimization.

After optimization, however, the inrush current peak value of all the electrical devices' (211-219) is significantly lower than before optimization and it is about the level of the device with the highest inrush current. The inrush current level of the system is relatively even (911, 912, 913) across entire power-up sequence and may fluctuate up and down (depending on the unique inrush values of the connected electrical devices' (211-219)) without any influence on the MCB (230) triggering circuit, which limit level is far above the optimized inrush current level. Note, the more electrical devices are connected to the power network, the higher the peak current difference between before and after optimization process thus more benefit from the invention.

During normal operation, a Smart Power Socket (500) is configured to update the inrush current values measurements, for connected electrical devices, after each device re-plug. This allows for better system operation, as the device inrush current may change over time. With once defined power-up sequence it may become obsolete. Having the most updated inrush current values the system is able to perform best optimization process up to date.

Figure 10:
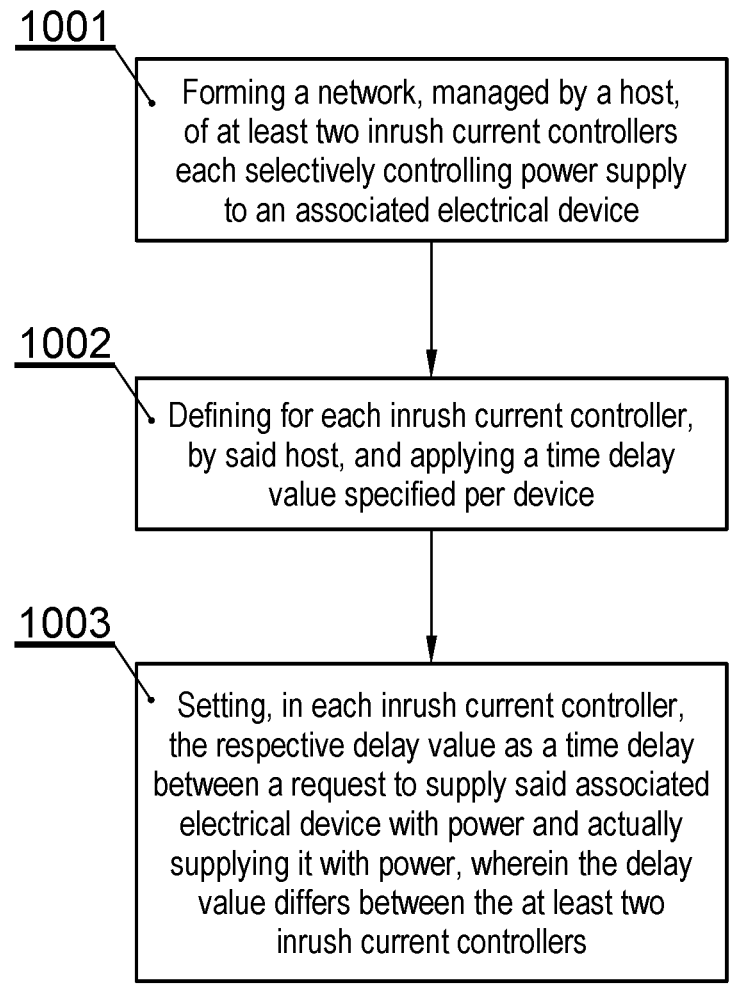
FIG. 10 presents a high level method for the system for minimizing inrush current of at least two electrical devices.

FIG. 10 presents a high level method for the system for minimizing inrush current of at least two electrical devices (211-219). The method starts from forming (1001) a network, managed by a host (420), of at least two inrush current controllers (500) each selectively controlling power supply to an associated electrical device (211-219). This context has been described with reference to the preceding figures.

Subsequently, the process moves to defining for each inrush current controller (500), by said host (420), and applying (1002) a time delay value specified per device (or said respective inrush current controller). For example, in case of 3 devices and a delay of 300 mS, the first device will be instructed to proceed without or with a delay, the second device will be instructed to proceed with a delay of 300 mS added to the delay of the preceding (first) device, while the third device will be instructed to proceed with a delay of 300 mS added to the delay of the preceding (second) device. As an example, this may result in the first device applying a delay of 300 mS, the second device applying a delay of 600 mS and the third device applying a delay of 900 mS.

Lastly, the method executed setting (1003), in each inrush current controller (500), the respective delay value as a time delay between a request to supply said associated electrical device (211-219) with power and actually supplying it with power, wherein the delay value differs between the at least two inrush (preferably each of them) current controllers (500).

Figure 11:
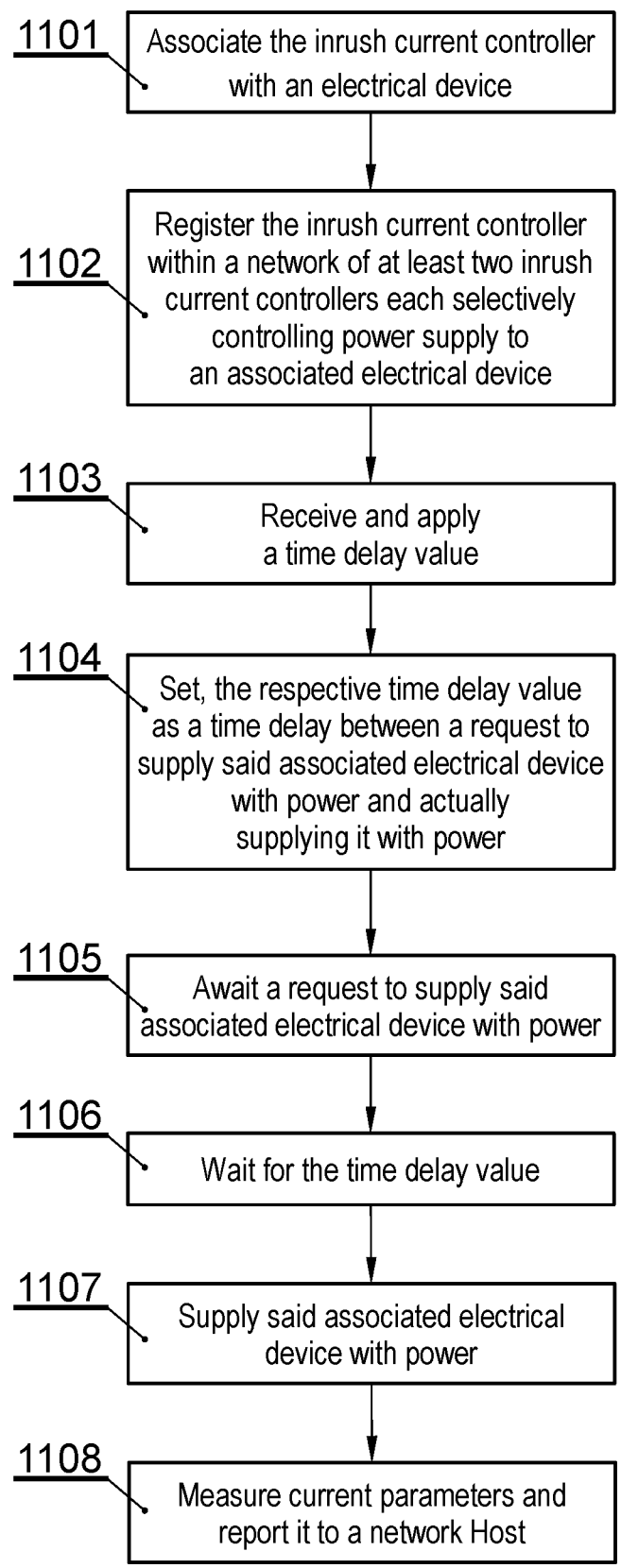
FIG. 11 depicts a high level method for operating an inrush current controller according to the present invention.

FIG. 11 presents a high level method for operating an inrush current controller (500) according to the present invention. The method starts from associating (1101) the inrush current controller (500) with an electrical device (211-219).

Subsequently, the method executes a step of registering (1102) the inrush current controller (500) within a network of at least two inrush current controllers (500) each selectively controlling power supply to an associated electrical device (211-219).

Next, the inrush current controller proceeds receiving and applying (1103) a time delay value.

Lastly, the method executes setting (1104), the respective time delay value as a time delay between a request to supply said associated electrical device (211-219) with power and actually supplying it with power.

This part ends the required steps, while the following steps are optional starting from awaiting (1105) a request to supply said associated electrical device (211-219) with power;

Next, the inrush current controller (500) waits (1106) for the time delay value; and supplies (1107) said associated electrical device (211-219) with power.

Lastly, the method may start measuring (1108) current parameters and reporting it to a network Host (420).

Advantages of the present invention include but are not limited to the following:

ability to relax an inrush current peak of electrical devices when they are powered-on at the same time. This allows for the safe inrush current value not triggering an MCB;

not interfering with an electrical device, thus may be adapted to any existing equipment (depending on specific embodiments);

versatility due to the fact that the solution is applicable in either or both: a wall mounted Smart Socket or an adapter to a power plug, which gives flexibility;

may be an extension of the existing smart sockets, which are able to measure device's power consumption;

ability to detect and measure inrush current of a newly plugged-in electrical device;

presence of a Host Device, which manages the compatible devices (e.g. Smart Power Sockets) across a network;

communication over the electrical network, which it is connected to;

the proposed Smart Power Sockets comprise a new feature of precisely controlling delay time for powering mains;

ability to present new type of data for end-users: inrush current value of the electrical device;

ability of updating the system operating conditions: any inrush current value change is stored, therefore the optimization process may adjust power-up sequence accordingly;

readiness to operate with the future Smart MCBs;

allowing for slow increase of the total network power consumption in time, which is preferable from a perspective of the global energy distribution system; and scalability, the more electrical devices are connected to the system the more benefit from the invention.

In view of the foregoing, the invention provides a useful, concrete and tangible result. Because the present invention related to physical, electric current controlling devices as well as wireless communication between them, the machine or transformation test is fulfilled and that the idea is not abstract.

At least parts of the methods according to the invention may be computer implemented. Accordingly, the present invention may take the form of an entirely hardware embodiment, an entirely software embodiment (including firmware, resident software, micro-code, etc.) or an embodiment combining software and hardware aspects that may all generally be referred to herein as a "circuit", "module" or "system".

Furthermore, the present invention may take the form of a computer program product embodied in any tangible medium of expression having computer usable program code embodied in the medium.

It can be easily recognized, by one skilled in the art, that the aforementioned method for minimizing inrush current may be performed and/or controlled by one or more computer programs. Such computer programs are typically executed by utilizing the computing resources in a computing device. Applications are stored on a non-transitory medium. An example of a non-transitory medium is a non-volatile memory, for example a flash memory while an example of a volatile memory is RAM. The computer instructions are executed by a processor. These memories are exemplary recording media for storing computer programs comprising computer-executable instructions performing all the steps of the computer-implemented method according the technical concept presented herein.

While the invention presented herein has been depicted, described, and has been defined with reference to particular preferred embodiments, such references and examples of implementation in the foregoing specification do not imply any limitation on the invention. It will, however, be evident that various modifications and changes may be made thereto without departing from the broader scope of the technical concept. The presented preferred embodiments are exemplary only, and are not exhaustive of the scope of the technical concept presented herein.

Accordingly, the scope of protection is not limited to the preferred embodiments described in the specification, but is only limited by the claims that follow.

The invention claimed is:

1. A method for minimizing inrush current of at least two electrical devices comprising:

forming a network, managed by a host, of at least two inrush current controllers each selectively controlling power supply to an associated electrical device, wherein each of the at least two inrush current controllers is implemented in a wall socket, a power strip or a socket adaptor;

measuring, by each of the at least two inrush current controllers, data indicative of an inrush current ("inrush data") of the associated electrical device and data indicative of normal operating current ("current data") of the associated electrical device;

obtaining, by said host, from each of the at least two inrush current controllers, said inrush data and said current data;

determining, by said host in accordance with said inrush data, an optimized power on sequence in respect of the at least two electrical devices, wherein the electrical device with highest said inrush data powers on first prior to the electrical device with lower said inrush data;

defining, by said host in accordance with said optimized power on sequence, a time delay value for each of the at least two inrush current controllers, said time delay value being a time delay between a request to supply the associated electrical device with power and actually supplying it with power, such that the defined time delay values in respect of the at least two inrush current controllers cause the associated at least two electrical devices to receive power according to said optimized power on sequence;

setting, in each inrush current controller, the respective time delay value;

supplying power based upon the respective time delay value; and wherein the time delay value differs between the at least two inrush current controllers.

2. The method according to claim 1 wherein said network comprises one of a wired electrical network or a wireless network.

3. The method according to claim 1 wherein said delay value is in a range of 100 ms to 1000 ms.

4. A method for operating an inrush current controller comprising:

associating the inrush current controller with an electrical device;

registering the inrush current controller within a network of at least two inrush current controllers, each selectively controlling power supply to an associated electrical device, wherein each of the at least two inrush current controllers is implemented in a wall socket, a power strip or a socket adaptor;

measuring, by each of the least two inrush current controllers, data indicative of an inrush current ("inrush data") of the associated electrical device and data indicative of normal operating current ("current data") of the associated electrical device;

providing said inrush data and said current data of the associated electrical device to a host;

receiving a time delay value from the host, wherein each of the at least two inrush current controllers receives a different time delay value;

setting the time delay value as a time delay between a request to supply said associated electrical device with power and actually supplying it with power;

supplying power based upon the time delay value; and wherein the time delay values received by the at least two inrush current controllers cause the associated electrical devices to receive power in a predetermined power on sequence, wherein the predetermined power on sequence is determined by the host in accordance with said inrush data of each of the at least two associated electrical devices, and wherein the electrical device with highest said inrush data rowers on first nor to the electrical device with lower said inrush data.

5. The method according to claim 4 further comprising:
awaiting the request to supply said associated electrical device with power;
waiting for the time delay value; and
supplying said associated electrical device with power.

6. A non-transitory computer readable medium storing computer-executable instructions that when executed on a computer cause the computer to perform the method according to claim 4.

7. An inrush current controller comprising:
mains input for connecting to a power network;
controllable mains output for connecting at least one electrical device;
a controller configured to selectively connect the mains input to the mains output; and
a memory communicatively coupled to the controller;
wherein the inrush current controller is configured to execute the method according to claim 4.

8. The method according to claim 4 wherein the time delay value is in a range of 100 ms to 1000 ms.

* * * * *